F. ZALESKI.
MACHINE FOR MAKING COMPOSITE INSOLES.
APPLICATION FILED MAR. 10, 1917.
1,227,729.
Patented May 29, 1917.
7 SHEETS—SHEET 1.
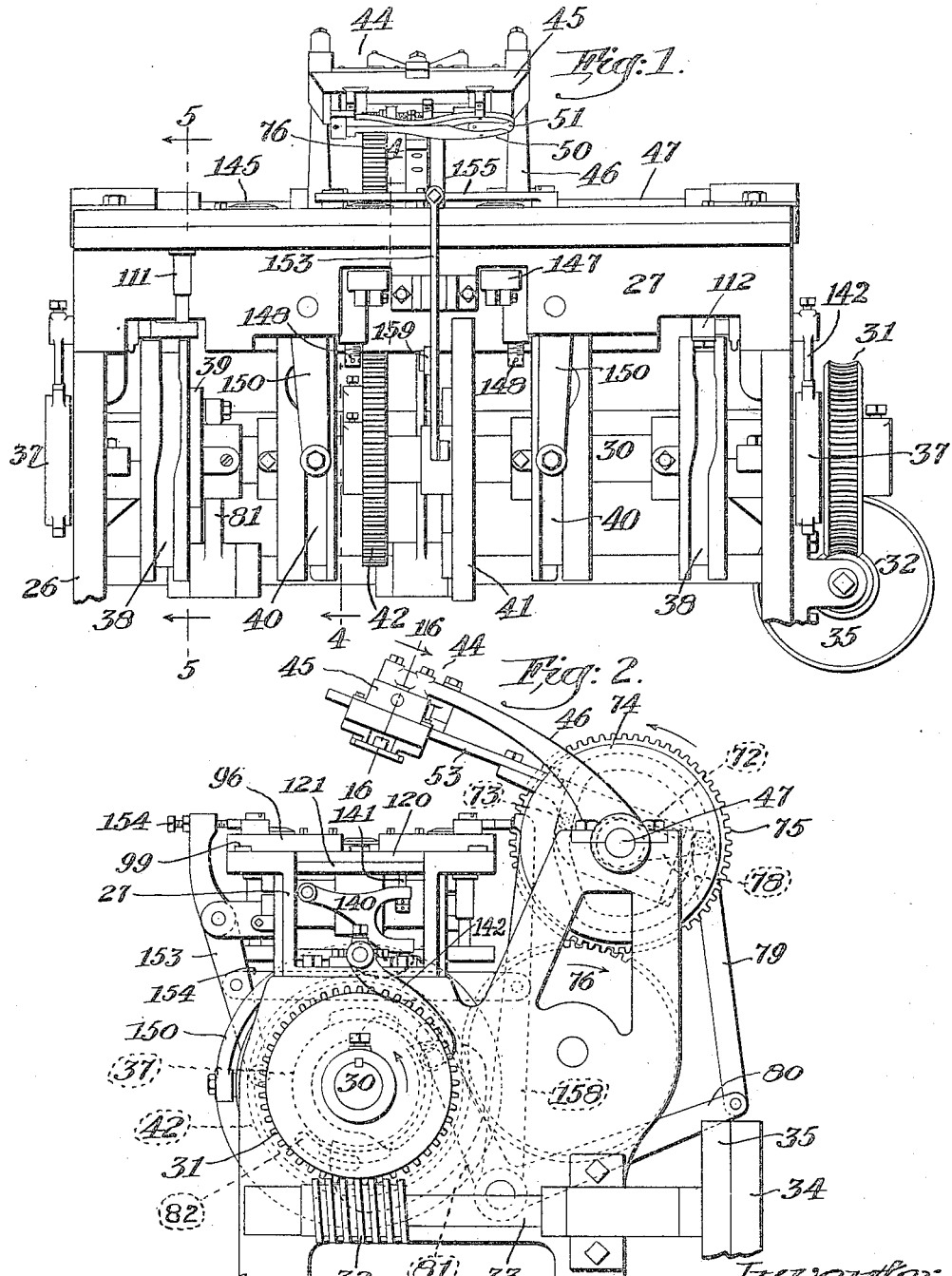

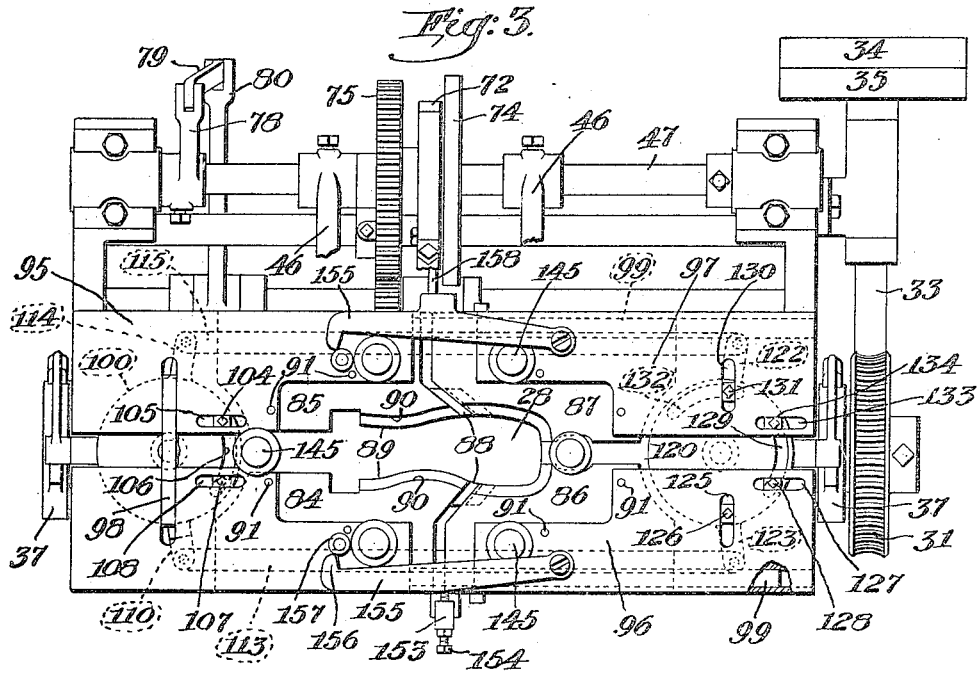

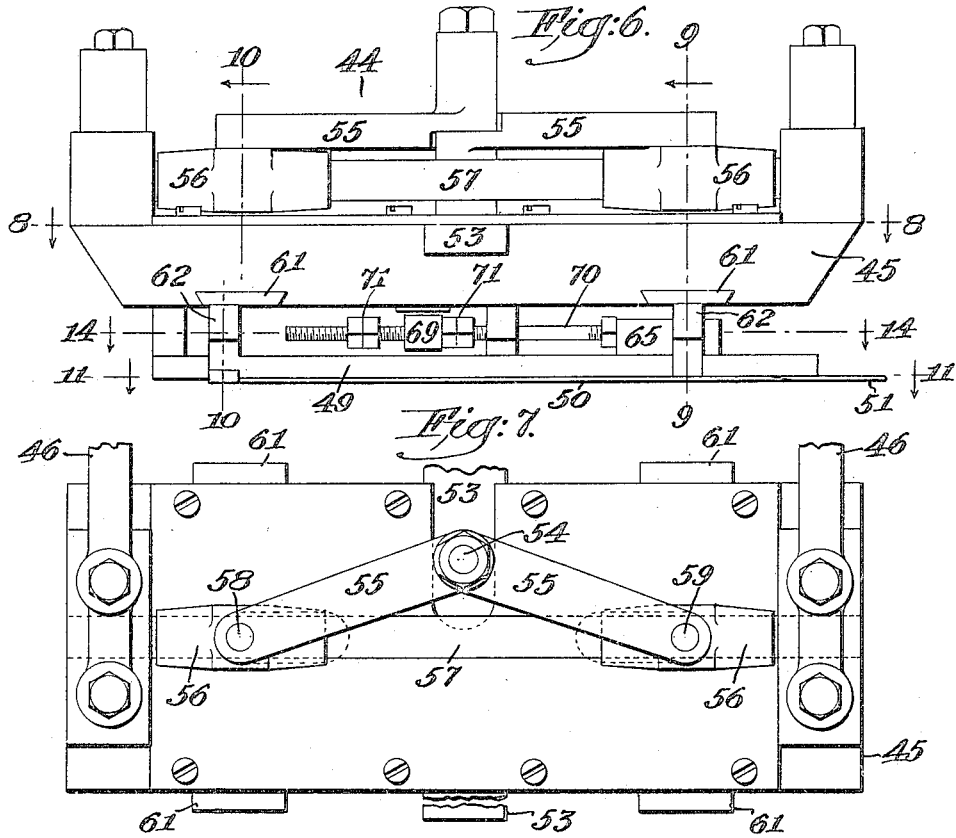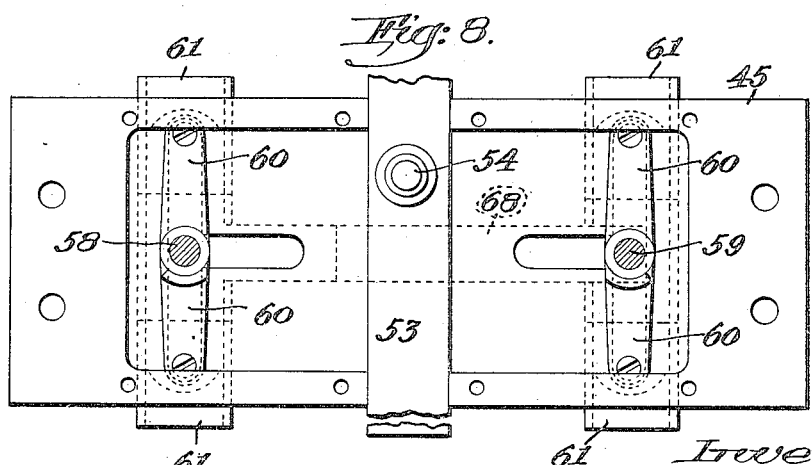

F. ZALESKI.
MACHINE FOR MAKING COMPOSITE INSOLES.
APPLICATION FILED MAR. 10, 1917.
1,227,729.
Patented May 29, 1917.
7 SHEETS—SHEET 4.
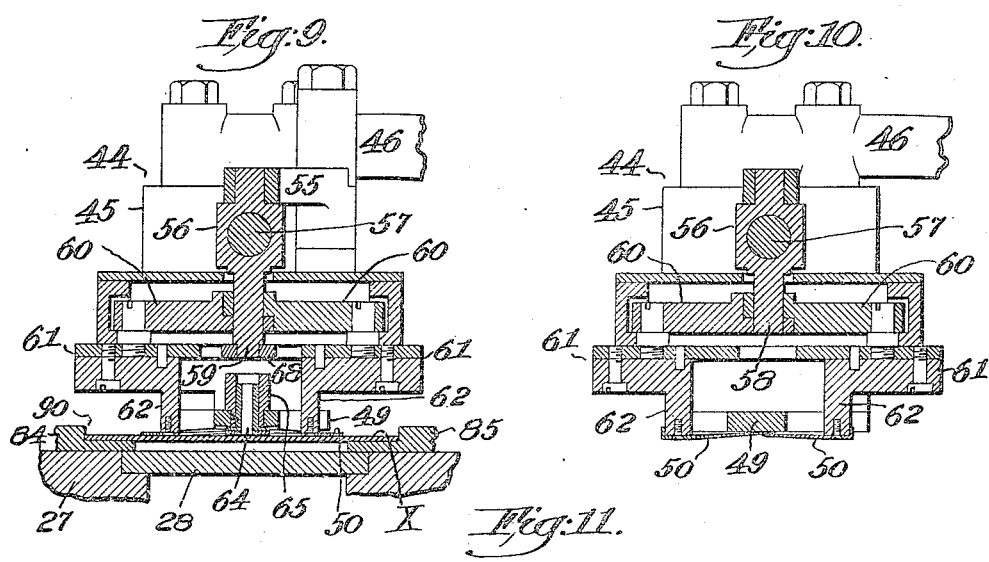
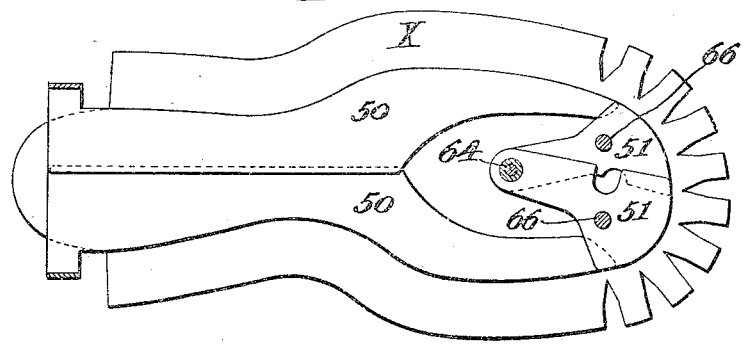
Inventor,
Frank Zaleski,
by Rogers, Kennedy & Campbell,
his Attys

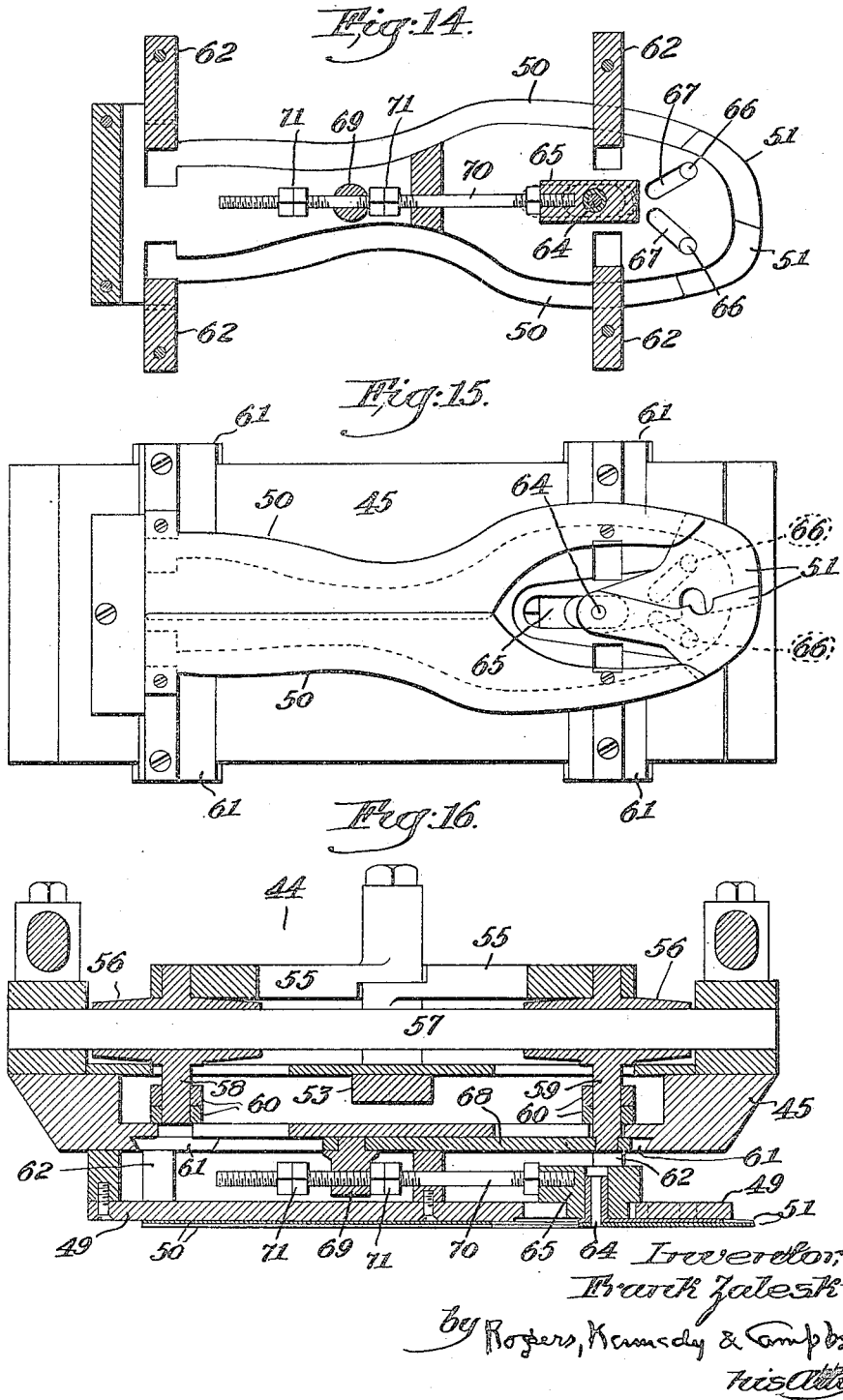

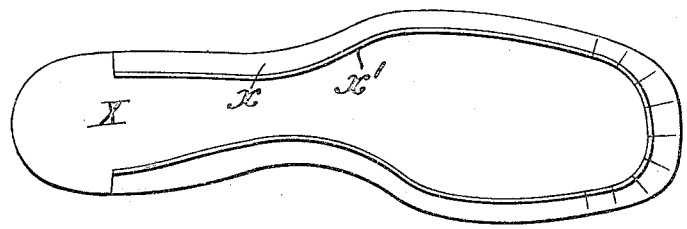
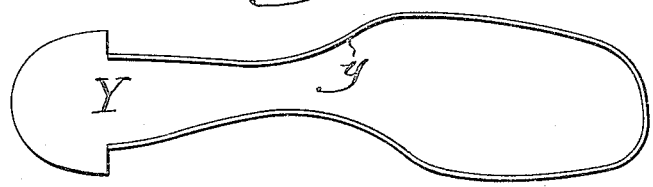
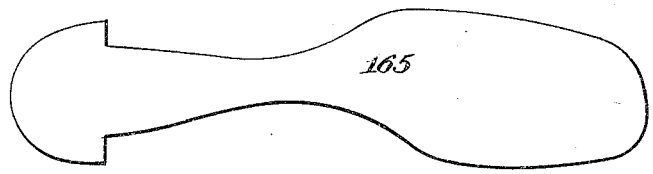
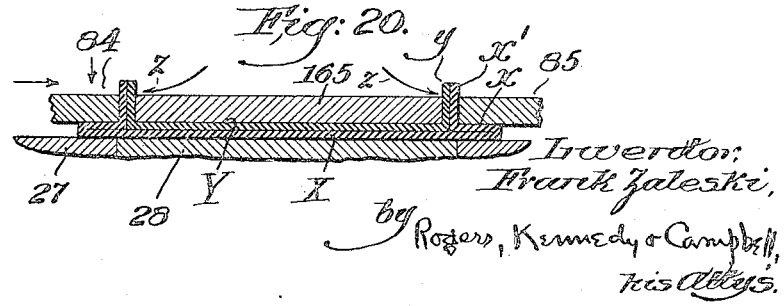

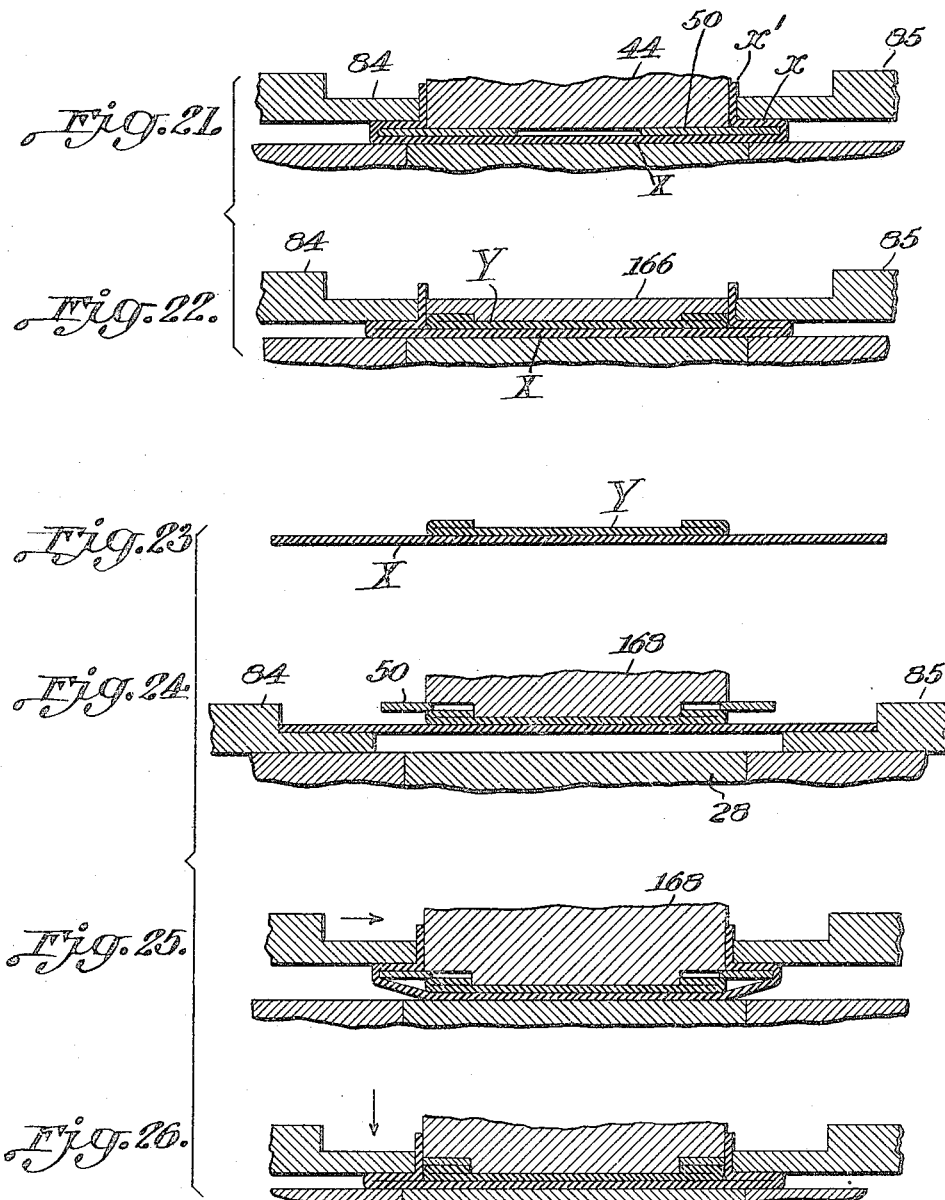

UNITED STATES PATENT OFFICE.

FRANK ZALESKI, OF WEST ROXBURY, MASSACHUSETTS, ASSIGNOR TO REECE SHOE MACHINERY COMPANY, OF BOSTON, MASSACHUSETTS, A CORPORATION OF MAINE.

MACHINE FOR MAKING COMPOSITE INSOLES.

1,227,729.  Specification of Letters Patent.  Patented May 29, 1917.

Application filed March 10, 1917. Serial No. 153,794.

*To all whom it may concern:*

Be it known that I, FRANK ZALESKI, a subject of the German Emperor, residing at West Roxbury, in the county of Suffolk and State of Massachusetts, have invented certain new and useful Improvements in Machines for Making Composite Insoles, of which the following is a specification, reference being had therein to the accompanying drawing.

This invention relates to machines for making composite insoles, an example of which insoles is shown in Patent 1,062,536, granted May 20, 1913, to Coleman, although the principles of the present invention are useful in making other forms of composite insole, for example, that shown in Patent 1,206,927, granted December 5, 1916, to Schoenky. It will be understood that in the manufacture of insoles it is important to provide a lip standing out from the surface of the insole at one side, which in the wear of the shoe will be the underneath side, opposite to the side with which the foot has contact when the insole is made into a shoe. In the two instances mentioned of composite insoles, two layers of leather are employed, which may respectively be referred to as the outer and inner layers, these being so constructed and combined as to afford the desired lip at the underside of the insole. This lip is the portion by which the insole is connected or stitched to the upper or welt or outsole in the manufacture of the shoe, the lip being for this purpose in the nature of a flange extending around near the margin of the insole slightly inward of its outer edge. The outer margin of the insole constitutes what is known as the feather edge thereof, which is desired to be adequately stiff and solid, while the lip or rib, as before stated, is the part which receives the inseam stitches.

On October 21, 1916, and January 6, 1917, respectively, I applied for patents on "method of making composite insoles" and "means for making composite insoles". The first mentioned application has since resulted in Patent No. 1,211,520, granted to me January 9, 1917. The present application for patent is in part a continuation of my aforesaid application filed January 6, 1917, which is based on drawings containing the same disclosure as my Patent 1,211,520.

The main object of the present invention is to afford a suitable machine or apparatus for the making of the composite insoles referred to in the Coleman, Schoenky or Zaleski patents, or analogous insoles. The methods or procedures described in said three patents differ somewhat, and the principles of the present invention are intended to apply to machines for making composite insoles by any of such methods or analogous methods.

Another object hereof is to perform by power or automatically as far as possible the manufacture of composite insoles, and thereby minimize the difficulties of the hand operations described in said three patents, and to increase the output, efficiency and accuracy of the work.

Other and further objects and advantages of the present invention will be pointed out in the hereinafter following specification or will be apparent to those skilled in the art.

To the accomplishment of such objects and advantages the present invention consists in the novel apparatus, machine, combinations, devices, details and other features described or illustrated herein.

In order to fully disclose the principles of the present invention I will describe one or more machines embodying the same by way of example, but, since various mechanisms, arrangements, combinations and other features could be indefinitely varied without departing from the principles involved, I do not intend to limit my claim of invention to such features excepting in so far as set forth in the appended claims.

In the accompanying drawings forming a part hereof Figure 1 is a front elevation of an insole making machine embodying the present invention, the base and legs of the machine being broken off and omitted for the purposes of condensation of illustration.

Fig. 2 is a right elevation of the machine shown in Fig. 1.

Fig. 3 is a plan view thereof with the die or holding or forming member omitted.

Figs. 4 and 5 are partial cross-sections taken on the planes 4—4 and 5—5 of Fig. 1, respectively.

Fig. 6 is a front elevation of the die or forming member detached, while Fig. 7 is a plan view and Fig. 8 a plan partially in section on the horizontal plane 8—8 of Fig. 6.

Figs. 9 and 10 are transverse sections of the die or former taken respectively on the planes 9—9 and 10—10 of Fig. 6.

Fig. 11 is a plan view showing the shape giving plates of the die in their expanded position resting upon a piece of leather X, while Fig. 12 shows the same parts after the margins of the leather have been folded and formed and the parts of the die contracted to permit removal.

Fig. 13 is a transverse cross-section showing the relative position of the leather piece X and the die and infolders before the contraction of the die. Figs. 12 and 13 show the outer leather piece X having been formed into an infold $x$ and an upturned lip $x'$.

Fig. 14 is a plan partially in section on the plane 14—14 of Fig. 6.

Fig. 15 is a bottom plan view of the die or forming member of Figs. 6 to 14.

Fig. 16 is a central longitudinal section of the die or former taken on the plane 16—16 of Fig. 2.

Fig. 17 is a plan view of the outer leather piece X after having been formed with an infold $x$ and lip $x'$, as in Fig. 12, but with the die or former removed.

Fig. 18 shows a face view of the inner leather piece Y provided with a lip $y$ extending around the insole to an extent corresponding with the outer leather piece X.

Fig. 19 is a top plan view of an interior form to be described.

Fig. 20 is a transverse cross-section showing the inner leather piece Y set in place within the outer leather piece X and indicating the relation thereof to certain infolding and forming members.

Figs. 21 and 22 indicate a slightly different embodiment of the invention, showing the successive steps in the operation when the machine is employed to make the insole of the Schoenky patent.

Figs. 23, 24, 25 and 26 show another somewhat different mechanism and order of operation, in which the actual method referred to in the Schoenky patent is followed out.

In general the machine comprises a top or fixed table, beneath which are located the power connections or drive connections, and above the table are coöperatively arranged and connected the die or forming member and connections by which it may be swung to and from the table and expanded and contracted; also a group of infolding members, and connections for causing them to move toward each other for folding or forming the leather, and for lifting and lowering at certain times to coöperate with the several movements, and to permit effective squeezing pressure to set and render permanent the folds in the leather. In the main embodiment illustrated the method and operations may be performed, for example, substantially in the following order to make an insole of the Coleman type. The outer blank piece or layer of leather X is first inserted above the table, and the die or former is then automatically swung down and positioned on the blank. The die being expanded and held firmly upon the blank X, the infolders are then lifted, if necessary, and moved inward in order to infold inwardly the leather margin, forming the infold $x$. It will be understood that the leather is in tempered or soft condition, and, as seen in Fig. 11, it is cut away at the most curved portions suitably to afford an unwrinkled infold and lip. The inward movement of the infolders does not cease until the vertical front edges of the infolders are brought forcibly against the vertical surface of the heavy portions or abutments of the die, inward of the expanded edges of the die, as indicated in Fig. 13, so that not only is the infold $x$ formed, but also the upstanding lip $x'$. The bed, and the forming and folding parts may be kept in heated condition to expedite the setting of the leather, and the infolds may be more forcibly fixed by a squeezing pressure between the bed and infolders. The die may now be contracted to the Fig. 12 position and extracted from the work, and the second blank Y having a lip $y$, as in Fig. 18, may now be inserted within the formed first blank X, following which a solid form may be inserted in the interior, all as indicated in Fig. 20. Usually glue will be spread over the interior surface of the folded blank X and inside of the fold $x$, and it may be desirable in performing this operation to bodily remove the folded blank X from the machine, apply glue by brush, insert the inner blank Y and the solid form, then replacing these assembled parts in the machine. The die or former is now rendered inoperative, and the machine is caused to operate to bring the infolders again inwardly over the fold $x$ until by coöperation with the interior form the upstanding flanges or lips $x'$, $y$, are squeezed tightly together, while the depression of the infolders squeezes the infold $x$ tightly against the body of the blank X and, these operations being performed in the presence of heat, the glued surfaces are caused to permanently adhere.

While the parts are in the Fig. 20 position the upstanding lips may be smoothly and evenly trimmed with the infolders and the form as a guide for the knife. The composite insole is now completed, and upon removal is ready for the operations of lasting and welt sewing or other operations involved in the manufacture of a shoe.

The machine frame may consist of legs 26 extending up from a suitable base, and a frame top or fixed table 27, which is shown hollow to receive heating medium. The center of this table constitutes a bed piece 28, which serves as a support for the insole during its manufacture.

Extending from left to right is a main shaft 30, preferably power driven and which carries or drives the cams that perform the different operations, so that this power shaft constitutes a member which times and effects the different operations in a harmonious manner. The shaft at its right end is shown provided with a toothed wheel 31, engaging a worm 32 on a pulley shaft 33, having fast and loose pulleys 34 and 35.

Along the shaft 30 are a number of cams of such contour and so timed as to afford harmony in the operation of the machine, and these may be first conveniently enumerated before describing the parts above the table and the actuating connections.

At each end of the shaft is a cam 37, these two cams working in unison to bodily lift the several infolders at the time they are to move inward to fold the leather over the edges of the die. Near its opposite ends the shaft carries cams 38, 38, which operate through suitable connections to move the infolders inwardly and outwardly. At the inner side of the left cam 38 is a cam 39, which controls the lowering and lifting movements of the die or former. Nearer to the middle of the machine are cams 40, 40, which at the proper time forcibly depress the infolders for fixing and squeezing the folds. Another cam 41 is arranged to apply an additional force to assist the inward movement of the infolders and to cause them to be mutually locked in inward position in a manner that will be explained. This shaft also carries a gear wheel 42, by which the plates of the die or former are caused to expand or contract through a cam.

When the drive belt is on the fast pulley 34, the cam shaft 30 revolves continuously and the cams go through their movements, so as to automatically cause the various inward, outward, upward and downward or other movements of the dies and infolders to secure the desired operations on the leather, the timing also being such as to give the operator time to carry out the several hand-performed steps to be described, although I have in mind the possible automatic performance of the infeeding, outfeeding, gluing and other steps herein specifically described as hand-performed. The die or former 44 comprises a head or body or stock 45, mounted at the forward or swinging ends of a pair of carrying arms 46, supported at the rear by a rock shaft 47, suitably journaled in the frame. I will first describe the structure of the die, and afterward the automatic connections for expanding and contracting it, and subsequently the automatic connections for swinging it toward or from the work support or bed.

The die is shown only generally in Figs. 1 and 2, its details being more clearly disclosed in Figs. 6 to 16. Essentially, the die is provided with extended thin edges or shape-giving margins, about which the feather edge or fold $x$ of the insole is produced, and solid upstanding portions adapted to act as abutments to corresponding faces of the infolders in the production of the upstanding lip or flange $x'$ of the insole; the dies, therefore, coöperating with the infolders in a two-fold manner, namely, both as respects the formation of fold $x$ and the lip $x'$; and the shape-giving margins of the die being preferably contractible, so that, after the formation of the infold, the same can be withdrawn and the die extracted without reopening the folds.

Supported rigidly below the die body 45 is the horizontal member or thick plate 49, the outer upstanding faces of which form the abutments to the infolders in producing the lips of the insoles. Beneath the abutment member 49 are the shape-giving die plates 50, 50, 51, 51, which, when expanded, define the outer contour of the insole, and over which the infolds $x$ are produced. The construction of the plates 50 and 51 is shown in Figs. 11, 12 and 15. The plates 50 may have lateral movements toward and from each other in expanding and contracting, while the plates 51 at the toe end have a combined longitudinal and swinging movement to effectively extract them from the toe end of the insole. It should be observed that I prefer that the die plate edges, where they extend beyond the abutment member, are not of uniform width, but on the contrary are such as to produce a feather edge which is substantially wider at some parts of the insole than at others, for a purpose that will be explained. Also, it will be seen that, instead of having movable abutment members which contract and expand with the thin die plates, I have provided an abutment 49, which is solid or rigid with the body of the die, and therefore more firmly offers resistance to the heavy pressure produced by the power cams in forming the leather into the infold and lip. The die plates 50, 51, on the contrary, while they are immovably locked in position when expanded, are subsequently capable of contracting or withdrawing by movements relatively to the abutment, so that they withdraw completely from the folds, thereby permitting the folds to be squeezed between the infolders and bed, and permitting also the die to be lifted and disengaged while the blank still rests on the bed or work support.

The connections for moving the plates 50, 51, will be more easily described by commencing at the point where the train of connections enters the die. The operating connections on the die are such that, when the plates are expanded, they are positively locked in their outer positions against the possibility of accidentally being forced inwardly by the pressure on the leather by the infolders during the forming operations.

An actuator bar 53, see Fig. 2, is fitted to slide forwardly and rearwardly in the die head. This bar at its rear is connected to be automatically operated by connections later to be described, and at its front end the bar actuates the connections which extend to the plates 50 and 51 for expanding and contracting them.

Extending upward from the actuator bar 53 is a stud 54 connected by toggle links 55, 55 with a pair of longitudinally sliding members 56, 56, in the form of sleeves surrounding a fixed guide rod 57. Fig. 7 shows the die contracted, but when it is expanded the stud 54 is moved forwardly nearly into line with the slides 56, so that the links 55 practically straighten out and the mechanism is positively locked against accidental displacement.

Each of the slides 56 is provided with a downwardly extending stud 58, 59, and each of these studs is the center of a subsidiary toggle system, being connected to rearwardly and forwardly extending links 60. The other ends of the respective links are connected to forwardly and rearwardly sliding carriers 61, of which there is a pair for each pair of links. Each carrier 61 has a dovetailed fitting to the die head 45, and has a downward extension 62, to the bottom of which is directly connected one end of one of the side die plates. Thus, the front side die plate 50 is supported beneath the two front carriers 61, while the rear plate is similarly carried beneath the rear carriers 61. The toggle links 60 between the slides 56 and the carriers 61 are so arranged that they stand in alinement when the die is fully expanded. Thus, when the actuator bar 53 is thrust forwardly it serves to nearly straighten out not only the toggle 55, but it also straightens out the toggle 60 at each end, so that the die is expanded to its full width, and the plates are there firmly locked against the possibility of accidental contraction. When the side die plates are expanded, the plates 51 at the toe end are also to be expanded, and the following connections may serve therefor. The two plates 51, 51, are mutually pivoted at 64 to a carrier 65, which, like the studs of carriers 61, extends downwardly through suitable openings in the abutment plate 49. The carrier 65 is located between the carrier extensions 62 at the right end of the die, and the movement of the carrier 65 is longitudinal of the die rather than forward and rearward. Each of the plates 51 is provided with a second stud 66, these engaging in inclined slots or cams 67. As shown in Fig. 14, the slots are so designed that, when the carrier 65 is moved to the left, the plates 51 not only move to the left, but swing toward each other, thus effectively contracting out of the insole folds at the toe end, as seen in Fig. 12 compared with Fig. 11.

For convenience the carrier 65 may be actuated from the righthand slide 56, which, as before explained, is moved longitudinally. For this purpose the downward extension 59 of the righthand slide 56 is connected to a longitudinally sliding plate 68, suitably mounted at the under side of the die head. A downwardly extending stud 69 at the left end of the slide plate 68 is connected by a rod 70 with the carrier 65, so that the longitudinal movements are communicated to the swinging die plates 51.

As the carrier 65 need not move longitudinally to the same extent as the slides 56, a loose connection may be provided between the rod 67 and the stud 69 on the plate 68. Thus, the rod is shown extending loosely through the stud with a pair of lock nuts 71 at either side of the stud. These lock nuts are so adjusted that in the contraction of the die the withdrawal of the toe plates 51 is slightly delayed, which serves to compensate for the fact that the front and rear die plates commence their contracting movement at a very slow rate, owing to the action of the toggles 60.

The described die, therefore, is such that, when the actuater bar 53 is thrust forwardly, the die is expanded at the edges and solidly locked in expanded position, from whence the plates cannot be dislodged until, after the folding and forming operation, the actuator is shifted rearwardly to effect the contraction of the die.

The automatic actuation of the die expanding and contracting connections may be as follows. The actuator bar 53 is shown as provided with a yoke 72 at its rear end, this yoke straddling the shaft 47 for guidance, and provided with a stud 73, engaging the cam groove in the side of a cam disk 74, mounted loosely on the shaft 47. The contour of the disk cam is seen in Fig. 2, and the disk is secured to a gear 75, engaged and driven by a gear 76, which in turn is driven by the previously mentioned gear 42 on the main shaft.

In each single rotation of the main shaft, the die will be once contracted and once expanded. Fig. 2 shows the die elevated and contracted and in readiness to be lowered and expanded upon the blank. As constructed the infolders are adapted to be operated once during each shaft rotation, and, as the previously described preferred procedure contemplates two separate infolder operations, two complete shaft revolutions will be occupied in making each insole. Since, during the second part of the process, the die is not always required, although it might be used in lieu of the interior form hereinafter described, I prefer that the die shall be capable of being rendered inoperative. For this purpose the die when in its elevated position is capable of being swung by hand or otherwise rearwardly against a suitable stop at the rear of the shaft 47, so that it will not come into play, and, as will be seen, the die lifting and lowering connections are such as to permit this operation.

For lowering the die upon the work and lifting it therefrom, connections may be provided for rocking the shaft 47, which carries the die arms 46. To this end the shaft has a rearwardly extending arm 78 connected by a rod 79 to the rear arm 80 of a bell crank lever, the other arm 81 of which is provided with a cam stud resting against the periphery of the before mentioned cam 39 on the main shaft. The contour of the cam 39 is seen in Fig. 2, and its following stud is seen to rest against the cam by the force produced by the weight of the die, so that at will the die can be thrown over rearwardly, as before described, without dislocating the connections. A lug 82, Fig. 2, may sometimes be used to bear on the cam stud of 81 to force the die down hard on the work during folding.

The infolders may be of various constructions, but for convenience I have shown a series of four infolders arranged to move inwardly or converge upon the work simultaneously. Thus, at the left or shank part of the insole is a front side infolder 84 and a rear side infolder 85. These two infolders are arranged to move forwardly and rearwardly with a purely transverse movement. At the toe end are corner infolders 86 and 87, each arranged and operated to move obliquely or diagonally toward and from the work. Each shank infolder 84 and 85 is shown as provided with an extension 88 adapted to preserve the continuity and alinement of these infolders with the infolders 86 and 87.

Each of the four infolders is of considerable strength and thickness to stand the heavy work required, and each is provided with an upstanding inner edge or face 89, adapted to coöperate with the abutment member 49 of the die in forming the upstanding lip of the insole. Behind the edge 89 the infolder is rabbeted, so as to afford a convenient surface on which the leather blank X may be laid, the several shoulders 90 serving to gage or position the leather when inserting it in the machine.

Each of the described infolders is in the nature of a detachable or interchangeable plate secured by suitable pins 91 to infolder carriers 94, 95, 96, 97, respectively, which latter are heavy members forming a permanent part of the machine. Each of the carriers 94 and 95 is transversely slotted at a convenient point to receive a guide bar 98, which enters the slots in both such infolders to preserve their alinement during their approaching and receding movements, as best seen in Figs. 3 and 5. Similarly, the two front infolder carriers and the two rear ones may be kept in alinement by guide bars 99.

For bringing about the movements of the infolders from the cams 38, 38 on the main shaft, the following convenient mechanism may be employed.

At the left end of the machine beneath the infolder carriers 94, 95 are a pair of superposed oscillating disks or actuators 100, 101. The lower oscillating disk has a downwardly extending sleeve 102 fitted for rotary movement in the table top 27, while the upper disk 100 has a shank 103 extending downwardly within the sleeve 102.

The topmost oscillating disk 100 is connected by a pin and block device 104 with a longitudinal slot 105 in the infolder carrier 95, so that the oscillation of the disk will move the carrier forwardly or rearwardly. The disk 100 is also provided with a concentric slot 106, through which projects a pin and block device 107 from the lower disk 101 into engagement with a longitudinal slot 108 in the carrier 94. By oscillating the disks in opposite directions the carriers will be caused to move toward or from each other.

For this purpose the upper disk 100 is provided with a forward extension 110, from which projects downwardly a pin 111, the end of which engages in a slot in a cam lever 112, which is pivoted at its rear end and has at its center a stud engaging the cam 38 on the main shaft. A longitudinal connecting rod 113 will be observed extending from the upper end of the pin 111 toward the right, and, as will be later explained, its far end is connected to the upper oscillating disk at the other end of the machine for actuating it.

The lower actuating disk 101 at the left end of the machine is provided with a rearward extension 114, connected by rod 115 with the lower disk at the right end of the machine.

At the right end of the machine the upper oscillating disk 120 is similarly superposed over a lower disk 121. The lower disk has a rearward extension 122 connected by a downward pin with the cam lever 112, engaging the cam 38 near the right end of the main shaft, and, as before stated, the extension 122 is connected by a rod 115 with the extension of the lower disk 101 at the left. The upper disk 120 at the right has a forward extension 123, which, as before stated, is connected by the rod 113 with the forward extension of the disk 100 at the left.

The active portions of the two cams 38, 38 being timed to act in unison, the result will be that all four actuating disks 100, 101, 120, 121 will oscillate simultaneously, the pair at each end oscillating in opposite directions.

In order that the oscillating disks 120, 121 at the right may give diagonal inward and outward movements to the infolders 86 and 87, I have so arranged a series of connecting pin and slot devices that each carrier acquires a component of motion from both disks, so that thereby substantially diagonal movements are possible. Thus, referring particularly to Fig. 3, the carrier 96 is shown as having a transverse slot 125, engaged by a pin and block device 126 on the disk 120, whereby the disk oscillation gives a longitudinal motion to the carrier. The carrier also has a longitudinal slot 127, engaged by a pin and block device 128, extending from the lower disk 121 through a curved slot 129 in the upper disk. This gives a transverse movement simultaneously with the leftward longitudinal movement of the carrier 96, resulting in a converging or diagonal inward movement of the infolder 86.

Similarly, the carrier 97 has a transverse slot 130 engaged by a pin and block device 131, extending from the lower disk through a slot 132 in the upper disk; also, a longitudinal slot 133 engaged by a pin and block device 134 extending from the upper disk.

By the described infolder actuating arrangement the rotation of the cams 38, 38 with the main shaft simultaneously causes the four infolders 84, 85, 86, 87 to move inwardly or converge upon the work, and subsequently to move outward to their withdrawn position.

As previously explained, it is desirable to effect a lifting of the infolders at the time of their inward movement in order to facilitate their passing smoothly over the defining edges of the die plates in the process of infolding the leather margins. It has been before stated that the cams 37, 37 at the ends of the main shaft effect this lifting movement, and it may be added that the mechanism is arranged so that the cams operate to lift the entire infolding system, including not only the infolders, but the infolder carriers and the upper and lower oscillating disks at each end. As seen in Fig. 5, the disks are capable of being lifted by sliding of their shanks vertically in the bearings in the table top, and, when lifted, the disks carry the entire weight of the infolding mechanism. A disk lifting lever 140 is shown in Fig. 2, its end portion resting upon, so as to be lifted at suitable times by a rock lever 142 actuated from, the cam 38. The upper arm of the cam lever 140 has a contact 141 bearing directly against the lower disk 101 or 121. The cams are timed to slightly lift the infolding system just before the infolders pass over the edges of the die.

In order to forcibly depress the infolders at the proper times to squeeze the blanks against the bed or support, as previously described, the following mechanism may be conveniently employed, operated from the cams 40, 40 on the main shaft. Overlying the infolder carriers are a number of presser heads 145. Six of them are shown so arranged that each infolder carrier is forced downwardly at two points. See Fig. 3. Each head has a downwardly extending shank 146. See Fig. 4. All of the shanks of the presser heads are operatively connected with a presser block 147 beneath the table, so that on the depression of the block the presser heads are all pulled downwardly. This block is centrally recessed, and provided with an adjustable contact 148, on top of which bears a short arm 149 of a powerful lever pivoted to swing about a fore-and-aft axis, the other or downward arm 150 provided at its extremity with a stud engaging the groove in the cam 40. It will be understood that the two cams 40 by oscillating the arms 150 from right to left cause the arms 149 to move upwardly and downwardly, so that, when moved downwardly, they will cause the powerful depression of the entire infolder system, so as to secure the desired squeezing of the folds.

While the oscillating disk mechanism for infolder actuation is quite efficient and satisfactory in giving the infolders the requisite direction of movement, I find it desirable to reinforce the converging pressure of the infolders against the leather by a device, which also may serve to lock the infolders in their inward positions. See Figs. 1, 2 and 3. Extending from the cam 41 on the main shaft is a lever 153 centrally pivoted and having an adjustable contact 154 at its upper end, so positioned that, when the cam throws the lower end of the lever outwardly, the contact will press forcibly inwardly upon a wedging and latching member 155, shown pivoted to the infolder 96, and having an inclined hook, wedge or latch 156 at its left end, adapted to coöperate with a roller 157 on the infolder 94 in such way that the forcing inward of the member 155 tends to draw the two infolders longitudinally toward each other, and at the same time to press them both transversely toward the rear of the machine.

The rear infolders 95 and 97 have provided a similar member 155 and roller 157, which are operated simultaneously with those at the front by means of an upright lever 158, connected by a link 159 to the lever 153, the levers being so proportioned as to give substantially the same movement to the two wedging and locking members 155.

During the second operation of the infolders upon each insole it has been stated that the interior space within the insole rib should be occupied by a form, and that the contracted die might serve for such form, or a separate loose form insertible by hand. Such a loose form is shown at 165 in Fig. 20, and the upper level of this may be flush with the upper level of the infolders, and of such height that, by trimming around the edge of the rib at the trim line $z$, Fig. 20, the resulting rib will be of the desired height. Instead of laying the die over backwardly into inoperative position during the second infolder actuation, the die may be allowed to descend so as to apply its weight upon the form 165 for the purpose of holding it firmly down upon the insole.

The operation of the apparatus has been described, but may now be briefly reviewed to advantage. The outer blank X, is shown in Fig. 9 as having been inserted against the gaging shoulders 90 on the infolders, and the die is shown as descended in contact with the blank. It will be understood that the die is to descend completely until the blank is held against the bed 28. The infolders are then caused to rise and move inwardly until the infold and lip are formed, as indicated in Fig. 13. Following this the blank and die will be disengaged, glue applied, the inner leather piece Y inserted, the form 165 inserted, and the infolders caused to again snugly press the different parts of the blanks together, as seen in Fig. 20, and to squeeze the folded-over feather edge downwardly against the bed, after which and after the trimming of the rib or lip, the insole is completed.

An insole of the form shown in the Schoenky patent may be made by similar steps, modified as indicated in the diagrammatic sketches of Figs. 21 and 22. Thus, after the formation of the infold and lip on the outer blank, as in Fig. 1, and the subsequent removal of the die, an inner blank Y may be inserted, having its margins flatly turned down upon itself, as in the Schoenky patent, and in the completion of the insole the form 165 may be replaced by form 166, rabbeted at the lower corners to accommodate the folded margins of the inner leather member, as in Fig. 22.

Or the actual method described in the Schoenky patent may be followed in the manner indicated in the diagrammatic sketches of Figs. 23 to 26, in which the outer and inner leather pieces X and Y are cemented together, as in Fig. 23, before insertion into the machine. The die 168 in this case may have its lower corners rabbeted to accommodate the margin folds of the inner piece, and the die plates located at a slight elevation above the under surface of the die, as indicated in Fig. 24. After the infolders have lifted and moved inwardly to form the infolds and lip, as in Fig. 25, the die may be contracted, and afterward the final squeezing performed by the infolders, as indicated in Fig. 26, thus completing the insole in one operation.

It will be observed that the described apparatus is in part an embodiment of my aforesaid copending application filed January 6, 1917, and can be used for carrying out the process set forth in my said Patent 1,211,520. In case my said patented process is followed, the inner and outer leather pieces X and Y will not be attached together before insertion into the machine, but the upper surface of the outer piece is covered with a substance adapted to become sticky when heated. The die 168 serves to hold the two leather members in proper relative position during the folding and formation of the lip on the outer piece. The advantage will thus appear of having the lower face of the die extending down to bear upon the blanks, while the collapsible die plates are located at a slightly higher level above the infolded margins of the inner leather piece.

It will thus be seen that I have described by way of example different embodiments of my invention, attaining in different ways the objects and advantages previously elucidated.

I claim:

1. Means for making insoles from sheet material comprising a support for the sheet material, a die or forming member adapted to be positioned over the material on the support and provided with a lip-forming portion and a collapsible templet having shape-giving edges, and folding members for infolding the material margin over said templet members and against the lip-forming portion of the die member, thereby forming said margin into a feather edge and lip.

2. A machine for making shoe insoles (of the type having feather edge and lip) from leather or analogous sheet material, including, in combination, a work support having a substantially stationary position in the machine frame, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions, infolders fitted to lift and move inwardly to infold the leather margins over the die plate edges and form the same into a lip against the abutment, and to subsequently press the infolds toward the support, and power actuating mechanism, operating through cams or the like, adapted to automatically time and effect the descending and rising die movements, the contracting and expanding thereof, the forming movements of the infolders and the fold-pressing movements thereof.

3. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions, means to automatically expand the die plates and lock them against contraction, infolders fitted to move inwardly to infold the leather margins over the die plate edges and form the same into a lip against the abutment, and power-actuated mechanism for automatically actuating the infolders to forcibly infold the leather edges while the die plates are expanded and form the same against said abutment and plates.

4. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions, means to expand the die plates and lock them against contraction, infolders fitted to move inwardly to infold the leather margins over the die plate edges and form the same into a lip against the abutment, and mechanism for actuating the infolders to forcibly infold the leather edges while the die plates are expanded and form the same against said abutment and plates.

5. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions relatively to the abutment, means to expand the die plates and lock them against contraction, infolders fitted to move inwardly to infold the leather margins over the die plate edges and form the same into a lip against the abutment, and mechanism for actuating the infolders to forcibly infold the leather edges while the die plates are expanded and form the same against said abutment and plates.

6. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions, means to automatically expand the die plates and lock them against contraction, infolders fitted to move inwardly to infold the leather margins over the die plate edges and form the same into a lip against the abutment, and power-actuated mechanism for automatically actuating the infolders to forcibly infold the leather edges while the die plates are expanded and form the same against said abutment and plates, and for subsequently automatically contracting the die to disengage it from the leather folds.

7. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment at a level substantially above the bottom of the die, infolders fitted to move inwardly to infold the leather margins over the die plate edges and form the same into a lip against the abutment, and actuating mechanism for effecting the forming movements of the infolders.

8. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment at a level substantially above the bottom of the die, the latter consisting of a plurality of plates fitted to contract and expand from and to their defining positions, and means for shifting them in unison, infolders fitted to move inwardly to infold the leather margins over the die plate edges and form the same into a lip against the abutment, and actuating mechanism for effecting the forming movements of the infolders.

9. A machine for making shoe insoles (of the type having feather edge and lip) from leather or analogous sheet material, including, in combination, a work support having a substantially stationary position in the machine frame, a die fitted to descend upon a blank on the support and to rise therefrom, and having an upstanding lip-forming abutment portion, and a thin plate-like fold-defining portion extending laterally beyond the abutment, infolders fitted to lift and move inwardly to infold the leather margins over the die plate edges and form the same into a lip against the abutment, and power actuating mechanism, adapted to automatically time and effect the descending and rising die movements, and the lifting and inward movements of the infolders.

10. A machine for making shoe insoles (of the type having feather edge and lip) from leather or analogous sheet material, including, in combination, a work support having a substantially stationary position in the machine frame, a die fitted to descend upon a blank on the support and to rise therefrom, and having an upstanding lip-forming abutment portion, and a thin plate-like fold-defining portion extending laterally beyond the abutment, infolders fitted to lift and move inwardly to infold the leather margins over the die plate edges and form the same into a lip against the abutment, power actuating mechanism, operating through cams or the like, adapted to automatically time and effect the descending and rising die movements, and the lifting and inward movements of the infolders, and auxiliary power connections for forcing and locking the infolders in their inward positions.

11. A machine for making shoe insoles (of the type having feather edge and lip) from leather or analogous sheet material, including, in combination, a work support having a substantially stationary position in the machine frame, a die fitted to descend upon a blank on the support and to rise therefrom, and having an upstanding lip-forming abutment portion, and a thin plate-like fold-defining portion extending laterally beyond the abutment, infolders fitted to lift and move inwardly to infold the leather margins over the die plate edges and form the same into a lip against the abutment, power actuating mechanism, operating through cams or the like, adapted to automatically time and effect the descending and raising die movements, and the lifting and inward movements of the infolders, auxiliary power connections for forcing and locking the infolders in their inward positions, and power connections for causing a relative squeezing pressure between the support and infolders.

12. A machine for making shoe insoles (of the type having feather edge and lip) from leather or analogous sheet material, including, in combination, a work support having a substantially stationary position in the machine frame, a die fitted to descend upon a blank on the support and to rise therefrom, and having an upstanding lip-forming abutment portion, and a thin plate-like fold-defining portion extending laterally beyond the abutment, infolders fitted to lift and move inwardly to infold the leather margins over the die plate edges and form the same into a lip against the abutment, such infolders having their top side at a level whereby they may be used as gages in trimming the insole lip to the proper height.

13. A machine for making shoe insoles (of the type having feather edge and lip) from leather or analogous sheet material, including, in combination, a work support, a die fitted to descend upon a blank on the support and to rise therefrom, and having an upstanding lip-forming abutment portion, and a thin plate-like fold-defining portion extending laterally beyond the abutment, the latter consisting of a plurality of plates fitted to contract and expand from and to their defining positions, infolders fitted to move inwardly to infold the leather margins over the die plate edges and form the same into a lip against the abutment, and to subsequently press the infolds toward the support, and power actuating mechanism, operating through cams or the like, adapted to automatically time and effect the descending and rising die movements, the contracting and expanding thereof, the forming movements of the infolders and the fold-pressing movements thereof, whereby when a blank is inserted the die is automatically positioned on the blank in expanded condition, the infolders are then automatically moved inward to produce feather edge and lip on the insole, the die is then automatically contracted, whereby it is disengageable, and the infolders are then caused to squeeze the infolds against the support.

In testimony whereof, I have affixed my signature hereto.

FRANK ZALESKI.

Copies of this patent may be obtained for five cents each, by addressing the "Commissioner of Patents, Washington, D. C."